United States Patent
Eberlein et al.

(10) Patent No.: US 10,330,500 B2
(45) Date of Patent: Jun. 25, 2019

(54) METHOD AND APPARATUS FOR OPERATING A RESOLVER, AND RESOLVER DEVICE

(71) Applicant: Robert Bosch GmbH, Stuttgart (DE)

(72) Inventors: Edwin Eberlein, Stuttgart (DE); Manfred Kirschner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 15/534,646

(22) PCT Filed: Oct. 9, 2015

(86) PCT No.: PCT/EP2015/073339
§ 371 (c)(1),
(2) Date: Jun. 9, 2017

(87) PCT Pub. No.: WO2016/091425
PCT Pub. Date: Jun. 16, 2016

(65) Prior Publication Data
US 2018/0259363 A1    Sep. 13, 2018

(30) Foreign Application Priority Data
Dec. 11, 2014  (DE) .................. 10 2014 225 580

(51) Int. Cl.
*G01B 7/14* (2006.01)
*G01D 5/20* (2006.01)
*G01D 18/00* (2006.01)

(52) U.S. Cl.
CPC ........... *G01D 5/2073* (2013.01); *G01D 18/00* (2013.01)

(58) Field of Classification Search
CPC ...... G01D 5/20; G01D 5/2073; G01D 5/2291; G01D 5/2233; G01D 5/2046; G01D 5/046;
(Continued)

(56) References Cited

U.S. PATENT DOCUMENTS 5,469,032 A * 11/1995 Otake ................. B60L 3/0023
                                                              318/400.21
6,922,322 B2    7/2005 Strayer et al.
(Continued)

FOREIGN PATENT DOCUMENTS

CN        101341652 A      1/2009
CN        102980594 A      3/2013
(Continued)

OTHER PUBLICATIONS

International Search Report for Application No. PCT/EP2015/073339 dated Dec. 15, 2015 (English Translation, 3 pages).

*Primary Examiner* — Thang X Le
(74) *Attorney, Agent, or Firm* — Michael Best & Friedrich LLP

(57) ABSTRACT

The invention relates to an apparatus (7) for operating a resolver (1), which has at least one receiver winding (3, 4) or at least one excitation winding (2), which are/can be associated with a rotatably mounted shaft (5), in particular a rotor shaft of an electric motor, said apparatus also having a device (9) which determines an angular position of the shaft (5) as a function of an induced voltage detected by the excitation winding (2) by means of a desired excitation signal (SES) with a predeterminable frequency and amplitude and by the receiver winding (3, 4). According to the invention, means (10) for limiting an electrical voltage on the excitation winding (2) are associated with the excitation winding (2), wherein the means (10) limit the voltage only above a maximum normal voltage in only one current direction.

9 Claims, 2 Drawing Sheets

(58) Field of Classification Search
CPC ........ G01D 5/0487; G01D 5/049; G01D 1/08; G01D 1/10; G01D 1/0066; G01D 1/0808; G01D 3/08
See application file for complete search history.

(56) References Cited

U.S. PATENT DOCUMENTS

| | | | |
|---|---|---|---|
| 7,382,295 B2* | 6/2008 | Otsuka | B62D 5/046 250/231.13 |
| 2004/0017206 A1* | 1/2004 | Ura | G01D 3/08 324/522 |
| 2004/0150927 A1 | 8/2004 | Strayer et al. | |
| 2008/0172202 A1* | 7/2008 | Nakazato | G01D 3/08 702/151 |
| 2013/0049741 A1* | 2/2013 | Kichise | G01D 5/24461 324/207.16 |
| 2015/0061806 A1* | 3/2015 | Teising | H01H 9/0027 336/150 |

FOREIGN PATENT DOCUMENTS

| | | | |
|---|---|---|---|
| CN | 104321624 A | | 1/2015 |
| DE | 4432520 | | 2/1996 |
| DE | 102007026786 | | 4/2008 |
| DE | 102011078586 | | 1/2013 |
| JP | 2006258751 | * | 9/2006 |

* cited by examiner

METHOD AND APPARATUS FOR OPERATING A RESOLVER, AND RESOLVER DEVICE

BACKGROUND OF THE INVENTION

The invention relates to an apparatus for operating a resolver, which has at least one receiver winding and at least one excitation winding, which are/can be associated with a rotatably mounted shaft, in particular a rotor shaft of an electric motor, said apparatus also having a device which determines an angular position of the shaft as a function of an induced voltage generated by the excitation winding by means of a desired excitation signal, which can in particular be predetermined by the device and has a predeterminable frequency and amplitude, and said induced voltage is detected by the receiver winding.

The invention furthermore relates to a method for operating such a resolver as well as a resolver device.

A resolver is frequently used to detect the angular position of a rotor of an electric motor even in the motor vehicle industry. The resolver constitutes an electromagnetic transducer, which transmits an electrical variable, in particular a voltage, as a function of the angular position of the rotor. To this end, the resolver generally has a housing in which two receiver windings are disposed which are offset to one another by 90% and which enclose the rotor rotatably mounted in the housing. At least one excitation winding is furthermore associated with the rotor, said excitation winding being operated with a predeterminable desired excitation signal, which has a predeterminable frequency and a predeterminable amplitude. The excitation winding as well as the receiver winding can be fixedly disposed in the housing, respectively on the stator side, wherein the excitation winding generates a magnetic field in the rotor or respectively in the shaft per induction, which in turn induces a voltage into the receiver winding. The coupling in the receiver winding is in this case dependent on the position of the shaft or respectively the rotor, so that the position of the rotor or respectively the shaft can be suggested by evaluating the signal induced into the receiver winding.

The resolver is typically connected to a corresponding evaluation device or a control device by means of a simple plug connection comprising a corresponding evaluation device or a control device. If the resolver is incorrectly wired in or connected so that the connections of the excitation winding are interchanged, this leads to the detected position information being inverted.

SUMMARY OF THE INVENTION

The apparatus according to the invention has the advantage that an incorrect wiring, for example in the sense of a reversal of the connections of the excitation winding of the resolver can be reliably recognized using simple means. Provision is made according to the invention for means to be assigned to the excitation winding for limiting an electrical voltage at the excitation winding, wherein the means limit the voltage only above a maximum voltage in only one current direction. By a comparison of the desired excitation signal supplied to the excitation winding with the actually present actual excitation signal, it can now be suggested whether the resolver was wired up correctly or incorrectly, in particular whether the excitation winding is correctly or incorrectly wired, respectively is connected with reverse polarity. The device is expediently designed for test purposes to increase, in particular to double, the excitation frequency and the excitation amplitude of the desired excitation signal; thus enabling a voltage above the maximum normal voltage to be specified at the excitation winding. Depending on the wiring, the actual excitation signal is then influenced by the means such that the amplitude of the actual signal with respect to the amplitude of the desired excitation signal is distorted or respectively displaced. A correct or incorrect wiring can thus be suggested by comparing the amplitudes.

The means preferably comprise a Zener diode and a diode connected in series with the Zener diode. As a result, a voltage limitation can be implemented in only one current direction in a simple and cost effective manner. Of course, alternative embodiments of the means are also conceivable.

According to an advantageous modification to the embodiment, provision is furthermore made for the Zener diode and the diode to be connected in parallel to the excitation winding in order to implement the voltage limitation.

Provision is furthermore preferably made for an evaluation device that is associated with the excitation winding to be provided, said evaluation device acquiring the actual excitation signal and comparing the same to the desired excitation signal. As a result, the previously described comparison is carried out.

Provision is furthermore made for the device for a test operation to double the frequency and/or the amplitude of the of the desired excitation signal as mentioned earlier. In principle, it is expedient if the device increases the frequency and/or amplitude of the desired excitation signal. The simultaneous doubling of amplitude and frequency achieves the fact that the amplitude of the current does not change in the inductance of the excitation winding.

The method according to the invention is characterized in that the amplitude and the frequency of the desired excitation signal are increased for a test operation, in particular doubled, and in that an actual excitation signal of the excitation winding is acquired and is compared with the desired excitation signal in order to recognize a correct or incorrect wiring. The recognition of the wiring is carried out as previously described, and the previously mentioned advantages result.

Provision is furthermore preferably made for a correct wiring to be suggested if a positive amplitude of the actual excitation signal deviates from the desired excitation signal and for an incorrect wiring to be suggested if a negative amplitude of the actual excitation signal deviates from the desired excitation signal. In this way, a simple determination of the circuit is possible.

Provision is furthermore preferably made for a correct or incorrect wiring to be suggested as a function of a time phase in which the voltage is limited at the excitation winding by the means. In so doing, it can be alternatively or additionally recognized (for a plausibility check) if the excitation winding is, for example, correctly connected to the control device or an end stage of the control device or is connected the wrong way around. The positive or negative amplitude of the excitation signal can be determined as a function of the time phase and thereby determine at which amplitude a distortion by the voltage limiting means is elicited. Accordingly, a correct or polarity-reversed/incorrect wiring can be suggested as a function of the distortion or respectively deviation from the desired amplitude as previously described. Further features and advantages ensue from the above description.

BRIEF DESCRIPTION OF THE DRAWINGS

The resolver device according to the invention is characterized by the apparatus according to the invention, which particularly carries out the method according to the invention. The previously mentioned advantages ensue thereby. The invention is explained below in detail with the aid of the drawings. In the drawings.

DETAILED DESCRIPTION

Figure 1:
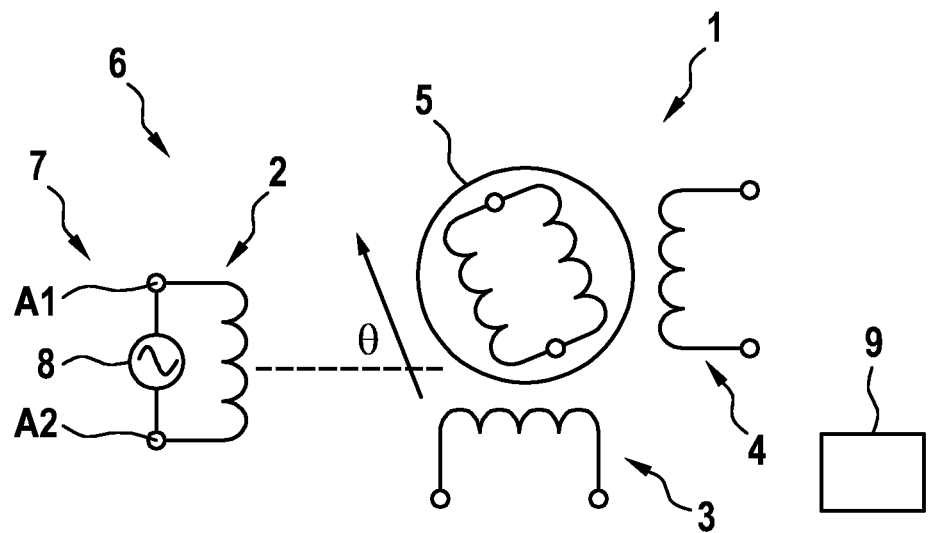
FIG. 1 shows a resolver in a simplified depiction.

In a simplified depiction, FIG. 1 shows a conventional resolver 1, which comprises an excitation winding 2 and a first receiver winding 3 and a second receiver winding 4. The receiver windings 3 and 4 are disposed around a shaft 5 and offset by 90°, which, for example, is a rotor shaft of an electric motor. The shaft 5 is rotatably mounted and can carry the excitation winding 2, wherein the excitation winding 2 can, for example, be electrically contacted by means of slip rings and brushes. According to the present exemplary embodiment, provision is however made for the excitation winding 2 to also be associated with the rotor so as to be fixed to the stator or respectively fixed to the housing in order to inductively couple a magnetic field into the rotor for the purpose of operating the excitation winding 2 with an excitation signal with a predetermined amplitude and frequency.

The shaft 5 is, for example, connected to the output shaft of an electrical motor in a rotationally fixed manner so that the angular position of the shaft 5 corresponds to the angular position of the output shaft of the electric motor or respectively the rotor. It is also conceivable that the output shaft of the electric motor directly forms the shaft 5.

During operation, the excitation winding 2 is excited by means of a desired excitation signal with an AC voltage, which generates a magnetic field in the shaft 5, which is detected by the receiver windings 3 and 4. The phase position of the voltage induced by the excitation winding 2, which is detected by the receiver windings 3 and 4, then depends on the position of the shaft 5. At an angular position of 0°, the maximum coupling of the magnetic field into the cosine track or respectively into the receiver winding 3 takes place. At an angular position of 90°, the maximum coupling of the magnetic field into the sinus track or respectively into the receiver winding 4 takes place. At an angular position of 45°, the magnetic field is coupled proportionally into the receiver winding 3 and the receiver winding 4. During a rotation of the rotor or respectively the shaft, the revolver 1 thus delivers a position modulated AC voltage to the receiver windings 3, 4.

Alternatively, the excitation winding is excited by means of a sinusoidal AC voltage. In this case, the amplitudes of the voltages induced in the receiver windings 3 and 4 are dependent on the angular position of the shaft 5 and correspond to the sine and the cosine of the angular position of the shaft 5.

The resolver 1 is a component of a resolver device 6, which furthermore comprises an apparatus 7 for operating the resolver. The apparatus 7 particularly comprises a signal generator 8, which, for example, has a voltage source and is electrically connected to the excitation winding 2 by means of a first connection A1 and a second connection A2. If the connections A1 and A2 are interchanged, i.e. the resolver 1 is wired incorrectly to the signal generator, this leads to an inversion of the angular information ascertained. With reference to the FIGS. 2 and 3, an advantageous modification to the apparatus 7 and a method are now to be explained, which reliably recognize an incorrect wiring of the resolver 1.

Figure 2:
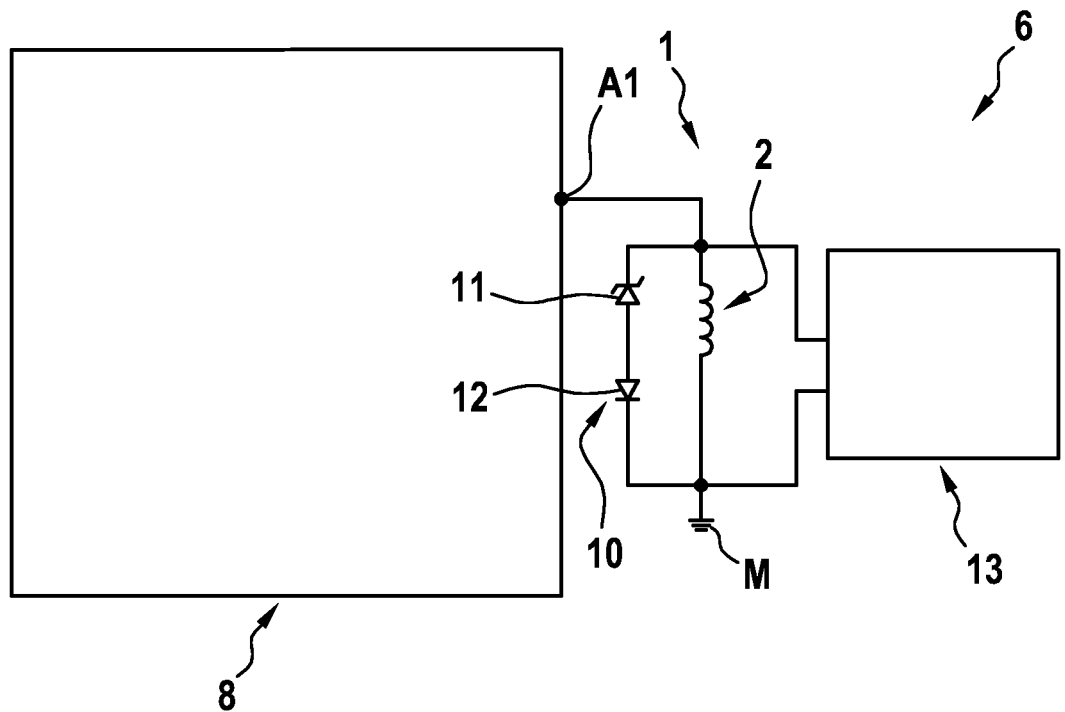
FIG. 2 shows an advantageous resolver device.

To this end, FIG. 2 shows the resolver device 6 in a simplified depiction including the signal source 8 and the excitation winding 2. In this case, only one connection A1 of the signal generator 8 is indicated and the excitation winding 2 is connected on one side to the connection A1 and on the other side to ground M.

The resolver device 6 furthermore has a device 9, which actuates the signal source 8 and evaluates the induced voltages acquired by means of the receiver windings 3, 4 in order to determine the angular position of the shaft 5 as previously described.

Means are associated with the excitation winding 10 for limiting a voltage through the excitation winding 2 in a current direction. The means 10 comprise a Zener diode 11 and a diode 12 connected in series and are connected in parallel to the excitation winding 2, wherein the Zener diode 11 has a blocking voltage of 12 volts in the present exemplary embodiment. In addition, an evaluation device 13 is associated with the excitation winding 2, said evaluation device acquiring the actual excitation signal of the excitation winding 2 and comparing the same to the desired excitation signal, which is specified by the device 9. The device 9 and the evaluation device 13 can also be formed by a single device, such as, for example, a control device.

During normal operation, the device 9 controls the resolver device 6 in such a way that a desired excitation signal is specified and implemented by the excitation winding 2. The voltage caused by excitation signal and induced into the shaft 5 is coupled into the receiver windings 3, 4 as previously described in order to determine the angular position of the shaft 5. The means 10 are thereby formed in such a way that they, during the normal operation of the resolver 1, do not limit the voltage and the current through the excitation winding 2 and do not influence or respectively impair the (normal) operation of the resolver.

In order to determine the correct wiring of the resolver 6 during a test operation, the device 9 changes the desired excitation signal in such a way that the amplitude and the frequency of the excitation signal are doubled. By the simultaneous doubling of amplitude and frequency, it is ensured that the amplitude of the current does not change in the inductance. Preferably the excitation signal is generated by a suitable electronic circuit, in particular by means of pulse width modulation by a microcontroller, for example, of the device 9 and preferably a filtering for a sinus signal formation is carried out. By doubling the amplitude and the frequency, the voltage predefined for the excitation winding 2 is increased beyond the maximum normal voltage. The means 10 now act in a voltage limiting manner on the voltage which is predefined at the excitation winding.

Figure 3:
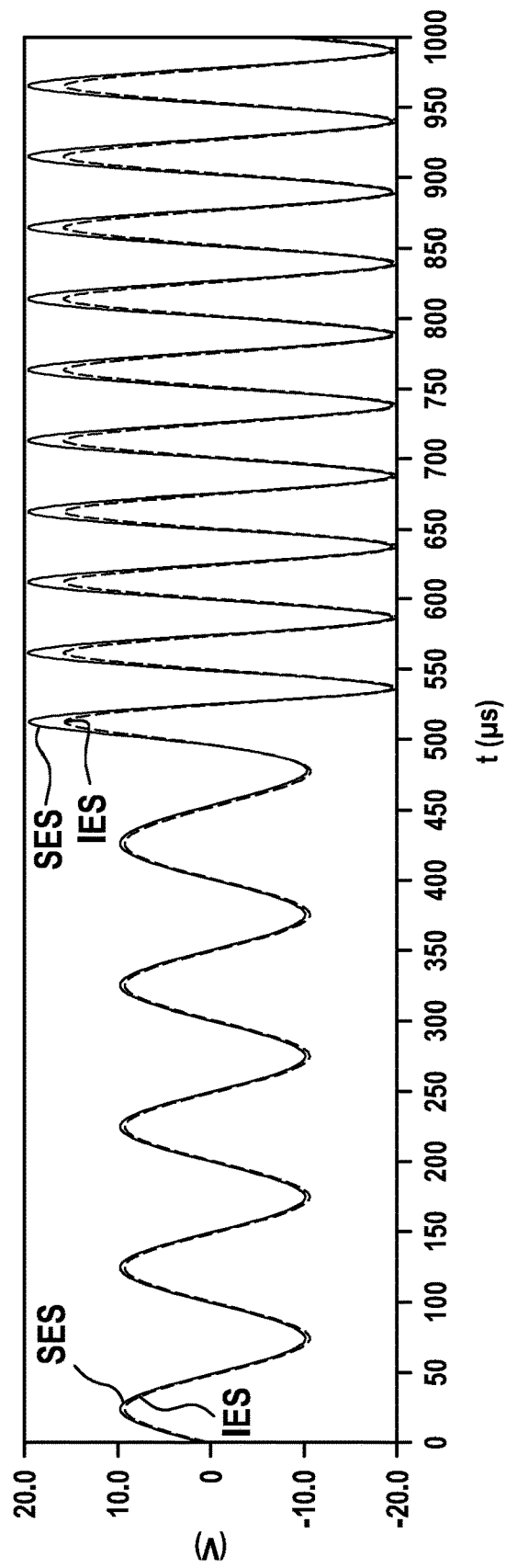
FIG. 3 shows excitation signals of an excitation winding of the resolver.

To this end, FIG. 3 shows the desired excitation signal SES and the actual excitation signal IES plotted over the time t in a diagram. In the first 500 µs, the resolver is actuated with the normal desired excitation signal. The actual excitation signal corresponds to the predefined desired excitation signal. After 500 µs, the amplitude and the frequency of the desired excitation signal are doubled. In wide time periods, the actual excitation signal immediately follows the desired excitation signal. However, in the time phase, in which the means 10 bring about a limitation of the voltage due to the larger amplitude, the positive amplitude of the actual excitation signal is distorted and deviates from the amplitude of the desired excitation signal.

In the case of an incorrect wiring of the resolver, the negative amplitude of the actual excitation signal is distorted. Thus, by reading back the excitation signal or respectively by acquiring the actual excitation signal ISE the correct or incorrect wiring of the resolver can be suggested in a simple manner.

During operation, the excitation winding 2 is, for example, operated with 20 Vpp (Volt peak peak), whereby the excitation signal SIN_HI oscillates between 10 volts and 20 volts and the excitation signal SIN_LO oscillates inversely between 20 volts and 10 volts. During the test operation, the amplitude would be increased to 40 Vpp and the frequency preferably would be doubled in order to prevent saturation effects. Subsequently, the excitation signal SIN_HI then oscillates between 5 volts and 25 volts and the excitation signal SIN_LO oscillates inversely between 25 volts and 5 volts. The Zener diode 11 in series with the conventional diode 10 between the connection HI and the connection LO of the excitation winding 2 is then active in certain phases. This clipping is then recognized by reading back the actual excitation signal as previously described.

The invention claimed is:

1. An apparatus (7) for operating a resolver (1), which has at least one receiver winding (3, 4) and at least one excitation winding (2), which are associated with a rotatably mounted shaft (5), said apparatus comprising:
a device (9) that determines an angular position of the shaft (5) as a function of an induced voltage generated by the excitation winding (2) by means of a desired excitation signal (SES) with a predetermined frequency and amplitude and detected by the receiver winding (3, 4), wherein the device is configured to increase the desired excitation signal;
means (10) for limiting an electrical voltage on the excitation winding (2), wherein the means (10) limits the voltage only above a maximum normal voltage in only one current direction; and
an evaluation device associated with the excitation winding, the evaluation device configured to detect the increased desired excitation signal and compare the increased desired excitation signal to an actual excitation signal of the excitation winding in order to recognize correct or incorrect wiring of the resolver.

2. The apparatus according to claim 1, wherein the means (10) comprises a Zener diode (11) and a diode (12) connected in series with the Zener diode (11).

3. The apparatus according to claim 1, wherein the Zener diode (11) and the diode (12) are connected in parallel to the excitation winding (2).

4. The apparatus according to claim 1, wherein the device (9) increases the desired excitation signal by increasing the frequency and/or amplitude of the desired excitation signal for a test operation.

5. The apparatus according to claim 1, wherein the device increases the desired excitation signal by increasing the frequency or amplitude of the desired excitation signal for a test operation.

6. A resolver device (6), the resolver device comprising:
a resolver including at least one receiver winding (3,4) and at least one excitation winding (2), which are associated with a rotatably mounted shaft (5);
a device that, during normal operation, determines an angular position of the shaft (5) as a function of an induced voltage generated by the excitation winding (2) by means of a desired excitation signal (SES) with a predetermined frequency and amplitude and detected by the receiver winding (3, 4), and, during a test operation, increases the desired excitation signal and compares the actual excitation signal to the increased desired excitation signal in order to recognize correct or incorrect wiring of the resolver.

7. A method for operating a resolver device, the resolver device including a resolver that has at least one receiver winding (3,4) and at least one excitation winding (2), which are associated with a rotatably mounted shaft (5), the resolver device also includes a device that determines an angular position of the shaft (5) as a function of an induced voltage generated by the excitation winding (2) by means of a desired excitation signal (SES) with a predetermined frequency and amplitude and detected by the receiver winding (3, 4), the method comprising:
increasing, for a test operation, the desired excitation signal (SES);
detecting, with an electronic processor, an actual excitation signal (IES) of the excitation winding;
comparing the actual excitation signal with the desired excitation signal; and
recognizing correct or incorrect wiring of the resolver device (6) based on the comparison of the actual excitation signal with the desired excitation signal.

8. The method according to claim 7, wherein recognizing correct or incorrect wiring of the resolver device includes recognizing a correct wiring when a positive amplitude of the actual excitation signal (IES) deviates from the desired excitation signal (SES) and recognizing an incorrect wiring when a negative amplitude of the actual excitation signal (IES) deviates from the desired excitation signal (SES).

9. The method according to claim 7, wherein recognizing correct or incorrect wiring of the resolver device includes recognizing an incorrect or correct wiring as a function of a time phase in which the voltage is limited by a zener diode and a diode connected in series.

* * * * *